May 16, 1944.                J. L. DRAKE                2,348,887
                    METHOD OF BENDING GLASS SHEETS
                      Original Filed June 2, 1938
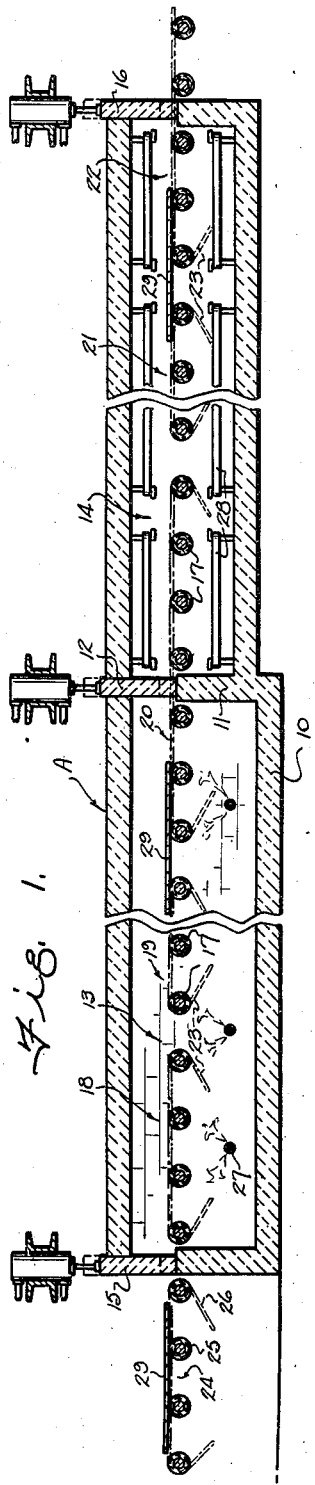
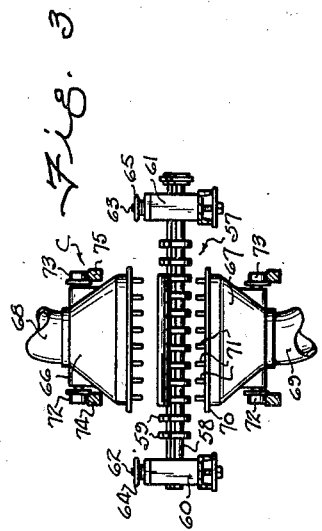
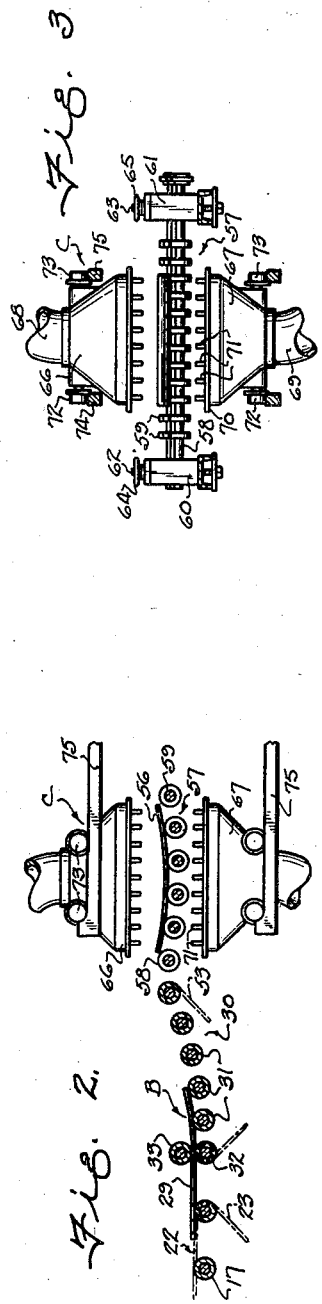
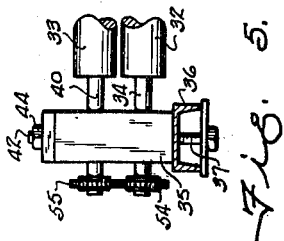
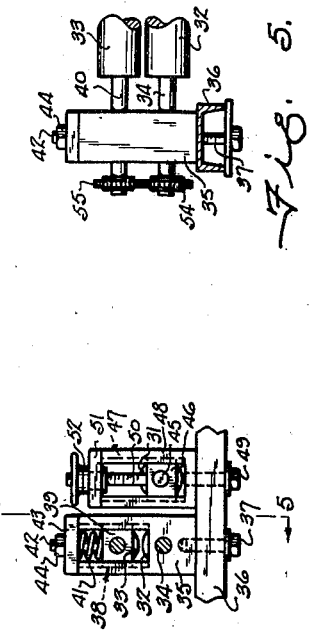
Inventor
JOHN L. DRAKE.
By Frank Graser
Attorney Patented May 16, 1944

2,348,887

UNITED STATES PATENT OFFICE 2,348,887

METHOD OF BENDING GLASS SHEETS

John L. Drake, Toledo, Ohio, assignor to Libbey-Owens-Ford Glass Company, Toledo, Ohio, a corporation of Ohio Original application June 2, 1938, Serial No. 211,343, now Patent No. 2,247,118, dated June 24, 1941. Divided and this application December 13, 1940, Serial No. 369,933

3 Claims. (Cl. 49—84)

The present invention relates broadly to the art of tempering glass and more particularly to an improved method for producing bent tempered sheets or plates of glass of predetermined curvature.

This application is a division of my copending application filed June 2, 1938, Serial No. 211,343, entitled "Apparatus for tempering glass" now Patent No. 2,247,118, dated June 24, 1941.

When tempering glass sheets, according to one well known process, the sheets are first heated to approximately the point of softening of the glass and then suddenly chilled to place the outer surfaces of said sheets under compression and the interiors thereof under tension. The treatment of glass sheets in this manner not only materially increases the mechanical strength of the glass, but further modifies its breaking characteristics so that, when broken, the glass will disintegrate into innumerable small and relatively harmless particles instead of breaking into large dangerous pieces or slivers as is the case with ordinary glass.

In the practice of the above process, the glass sheet is ordinarily maintained in a vertical position during the treatment thereof and it is customary to suspend the sheet from a plurality of relatively small tongs or hooks which engage the same near its upper edge. The glass sheet is first heated to the desired temperature in a suitable furnace and upon removal therefrom is subjected immediately to the action of suitable cooling devices by which the glass is suddenly chilled. These cooling devices usually comprise spaced blower heads between which the highly heated glass sheet is received and which serve to direct jets of air upon opposite surfaces of the said sheet simultaneously.

It has also been proposed to produce bent or curved sheets or plates of glass by the above process, but the suspending of the bent sheets in a vertical position by means of tongs is, however, not entirely satisfactory due to the fact that the tongs tend to bite into the glass upon the softening thereof, causing slight indentations or depressions which remain therein after tempering and which tend to mar the appearance of the sheets. Further, if the glass sheets are not properly hung from the tongs, they are very apt to become warped or distorted upon being heated to the point of softening of the glass. Also, the penetration of the tongs causes a definite weakness in the outer surface skins of the glass sheets, resulting in a tendency toward spontaneous fracture thereof. The marring of the glass sheets by the tongs would not be so objectionable were it possible to trim the sheets after tempering, but glass so tempered cannot be subsequently cut without causing the complete shattering thereof.

Generally speaking, it is the aim of this invention to produce curved or bent sheets or plates of tempered glass by the process described above of first heating the sheets to approximately the point of softening of the glass and then suddenly chilling the same. However, according to the present invention, the glass sheets are adapted to be bent and tempered while maintained in a substantially horizontal position, thereby eliminating the use of tongs or other supporting means which might tend to mar or injure the surface of the glass, the bending and tempering operations being effected with a minimum amount of handling of the glass sheets so as to greatly lessen the liability of warpage or distortion of the glass surfaces during treatment. The glass sheets are adapted to be successively heated to the desired temperature, bent to a predetermined curvature, and then suddenly cooled to complete the tempering thereof as the said sheets are carried horizontally forwardly to the end that the bending and tempering operations are carried out in a substantially continuous manner, with less liability of breakage of the glass as well as a reduced tendency toward marring of the glass surfaces.

Other objects and advantages of the invention will become more apparent during the course of the following description when taken in connection with the accompanying drawing.

In the drawing wherein like numerals are employed to designate like parts throughout the same:

Fig. 1 is a vertical longitudinal sectional view through the furnace employed for heating the glass sheets;

Fig. 2 represents a continuation of Fig. 1 and illustrates in section the rolls for bending the heated glass sheets as they emerge from the furnace, and in side elevation the means for subsequently cooling the bent sheets;

Fig. 3 is an end view of the cooling means;

Fig. 4 is a detail view of the means for mounting the bending rolls; and

Fig. 5 is a view taken at right angles to Fig. 4 on substantially line 5—5 thereof.

With reference now to the drawing, the letter A designates in its entirety the means for heating the glass sheets; B the means for bending the heated sheets to the desired curvature; and C the means for subsequently cooling the bent sheets to complete the tempering thereof, said heating, bending, and cooling means being preferably arranged in substantial horizontal alignment with one another so that the glass sheets can be passed directly from the heating means to the bending means and thence to the cooling means rapidly and conveniently and with a minimum loss of heat and exposure to the atmosphere, whereby the sheets will be acted upon by the cooling means while still in a uniformly heated condition.

The heating means A comprises an elongated furnace structure 10 substantially rectangular in cross section and divided transversely at a point intermediate its ends by a vertical partition wall 11 and vertically movable gate 12 into a preliminary heating section 13 and a final heating section 14. The entrance and exit ends of the furnace are also adapted to be closed by vertically movable gates 15 and 16 respectively. Arranged throughout the entire length of the furnace structure is a series of horizontally aligned conveyor rolls 17, and it is preferred that these rolls be divided into a plurality of separate conveyor sections, with the speed of rotation of said separate conveyor sections being independently controllable. By way of example, the rolls 17 are shown as being divided into the five conveyor sections 18, 19, 20, 21 and 22. The rolls 17 of each conveyor section are adapted to be simultaneously driven at a uniform speed in any desired manner such as by means of a chain and sprocket drive or the like 23. Arranged forwardly of the furnace is a receiving conveyor section 24 embodying a plurality of horizontally aligned rolls 25 arranged in horizontal alignment with the conveyor rolls 17 in the furnace and being also driven by a chain and sprocket drive or the like 26. The conveyor section 22 at the exit end of the furnace may extend outwardly therebeyond so as to deliver the heated sheet directly to the bending means B, as shown in Fig. 2.

The primary heating section 13 of the furnace is preferably heated with gas supplied thereto through burners 27, while the final heating section 14 is preferably electrically heated by means of the electric heating elements 28 disposed above and beneath the path of travel of the glass. These electric heating elements or resistors may be connected in series or parallel and may be controlled in the usual manner by necessary switches and rheostats.

In the tempering of the glass sheets, they are heated to approximately the point of softening of the glass which is ordinarily in the neighborhood of 1250° F. for flat glass and the sheets are adapted to be gradually brought to this temperature during their travel through the furnace 10. There is a decided advantage to be gained in dividing the furnace into a primary heating section and a final heating section and in heating the former with gas and the latter by electricity. For instance, it is well known that gas is a relatively cheaper fuel than electricity and therefore the cheap fuel is used for the primary heating of the glass, while the more expensive electric heat is used only for the final finishing heat. The glass sheets may be heated as they travel through the primary heating section 13 to approximately 1000 to 1100 degrees Fahrenheit, and in their passage through the final heating section 14 may be brought from this temperature to a temperature of 1250 degrees Fahrenheit. While gas is cheaper than electricity, yet it is also a well known fact that electricity produces a more uniform and constant heat than any of the other forms of heating. Consequently, during their travel through the final heating section, the glass sheets will be evenly and uniformly heated to the desired predetermined temperature. Although not so illustrated in the drawing, the conveying rolls 17 in the final heating section 14 may, if desired, be arranged relatively closer together than the rolls in the primary heating section 13 to prevent sagging of the softened glass therebetween.

The glass sheet 29 to be bent and tempered is initially placed by the operator upon the receiving conveyor section 24 at the entrance end of the furnace and it is preferred that this conveyor section along with the conveyor sections 18, 20 and 22 in the furnace be capable of being driven at either a relatively high speed or a relatively slow speed. In practice, when the glass sheet is placed upon the receiving conveyor section 24, the rolls 25 thereof are stationary. After the sheet is laid on the rolls 25, the operator causes the gates 12, 15 and 16 to be raised by suitable operating mechanism, and substantially simultaneously the rolls 25 of conveyor section 24 are adapted to be driven at a relatively high speed to deliver the glass sheet rapidly into the furnace. When the conveyor section 24 is driven at a high speed, the conveyor sections 18, 20 and 22 in the furnace are also adapted to be driven at a correspondingly high speed so that at the time one sheet is being fed into the furnace, another sheet will be rapidly transferred from the primary heating section 13 to the final heating section 14, and still another sheet delivered rapidly from the furnace to the bending means B. After each sheet is fed into the furnace, the gates 12, 15 and 16 are closed and the speed of the conveyor sections 18, 20 and 22 reduced to the same speed as the remaining conveyor sections in the furnace which may be driven at a constant, relatively slow speed. The conveyor section 24 can also be stopped until it is desired to feed another sheet into the furnace.

As the highly heated glass sheet 29 emerges from the exit end of the furnace, it is adapted to be passed directly to the bending means B which comprises a conveyor or runway 30 of the desired length formed of a plurality of bending rolls 31. The rolls 31 are arranged relative to one another so that the upper portions thereof define a radius of curvature which corresponds to the curvature to be given the glass sheet. In other words, the rolls 31 may be said to constitute a bending mold or form for shaping the glass sheet to the desired profile as it travels forwardly thereover. Mounted above the first bending roll 32, which will be hereinafter termed the lower pressure roll, and cooperating therewith is an upper pressure roll 33. The glass sheet 29 is adapted to be firmly clamped between the pressure rolls 32 and 33 as it is moved forwardly over the rolls 31 which act to bend said sheet to the desired curvature. While the pressure rolls and bending rolls may be of any desired construction, they are preferably formed of a material such as asbestos or the like or covered with asbestos or some other material which will not mar or scratch the surface of the glass.

The means for mounting and driving the bending rolls 31 and pressure rolls 32 and 33 are disclosed in Figs. 4 and 5. As shown, the roll 32 is carried by a shaft 34 having its opposite ends journaled in vertical standards 35 mounted upon channel beams 36 and secured thereto by screws or the like 37. Each standard is provided with a vertical guideway 38 and slidably mounted therein is a bearing block 39 within which is journaled the adjacent end of the shaft 40 of roll 33. The roll 33 is yieldably urged toward roll 32 by compression springs 41. These springs encircle vertical bolts 42 secured at their lower ends to the bearing blocks 39 and passing upwardly through the upper ends 43 of said standards 35. The bolts 42 have nuts 44 threaded upon the upper ends thereof to limit the downward movement of roll 33 toward roll 32 and also effective to regulate the distance between said rolls.

Each of the bending rolls 31 is carried by a shaft 45 journaled at its opposite ends in bearing blocks 46 which are slidable vertically in guideways 47 provided in standards 48 also secured to channel beams 36 by screws or the like 49. The bearing blocks 46 are carried by vertical bolts 50 which pass upwardly through the upper ends 51 of said standards and have associated therewith nuts 52. By rotating the nuts 52, the bending rolls 31 can be raised or lowered independently of one another to vary the curvature defined by the upper portions of said rolls so as to correspond to the curvature to which it is desired to bend the glass sheet. The rolls 31 and 32 can be driven in any desired manner such as by means of a chain and sprocket drive or the like 53 and the roll 33 can be driven from roll 32 by the intermeshing gears 54 and 55 fixed to the roll shafts 34 and 40 respectively.

Upon leaving the bending means B, the bent sheet indicated at 56 is adapted to be horizontally received upon a roller support 57 made up of a series of horizontal shafts 58, each of which carries a plurality of spaced, short cylindrical discs 59. The shafts 58 are journaled at their opposite ends in suitable standards 60 and 61 and are mounted for vertical adjustment relative to one another by means of vertical bolts 62 and 63 having nuts 64 and 65 associated with the upper ends thereof. In this manner, the said shafts 58 can be adjusted vertically independently of one another to vary the curvature of the support 57 to conform substantially to the curvature of the bent sheet of glass 56 as shown in Fig. 2.

The cooling devices proper consist of superimposed blower heads 66 and 67 arranged respectively above and beneath the roller support 57 and being connected by flexible conduits 68 and 69 to suitable blowing apparatus. The inner ends of the blower heads 66 and 67 are covered by plates 70 provided with a plurality of nipples 71 through which jets of air are directed simultaneously against opposite surfaces of the bent sheet of glass 56 supported upon the support 57. The blower heads 66 and 67 are preferably mounted for horizontal movement and to this end each blower head may be carried at its opposite sides by spaced rollers 72 and 73 adapted to travel upon horizontal rails 74 and 75. This arrangement is provided in order that the blower heads can be moved out of the way to permit the proper positioning of the bent sheet of glass upon the support 57, after which the blower heads can be readily moved back into position at opposite sides of the glass sheet.

In operation, the glass sheet 29 to be bent and tempered is first passed through the furnace A in the manner explained above and brought therein to the desired temperature. Upon being delivered from the furnace, the sheet passes over the bending rolls 31 which cooperate with the pressure roll 33 to effect the bending of the sheet to a predetermined curvature as it moves forwardly. The curved sheet 56 is then delivered onto the support 57 and the blower heads 66 and 67 are then adapted to direct a plurality of jets of air simultaneously upon opposite surfaces of the said sheet to complete the tempering thereof. Due to the provision of the discs 59 on shafts 58, the air from the lower blower head will be permitted to pass upwardly between the said discs and impinge upon the bottom surface of the sheet.

From the above, it will be apparent that the apparatus disclosed is substantially continuous in that the glass sheet is passed successively through the furnace A and bending means B to the cooling means C without any necessity for manual handling of the glass. As a result, the required handling of the glass is reduced to a minimum, thereby greatly lessening the liability of warpage or distortion of the glass surfaces during treatment. By maintaining the glass sheet in a horizontal position during the heating, bending, and cooling thereof, the use of tongs or other supporting means which tend to mar or disfigure the sheet are eliminated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of bending glass sheets, which comprises directing a continuously moving sheet, heated to the desired temperature, substantially horizontally between oppositely disposed sheet contacting elements and progressively bending the sheet to a predetermined curvature as succeeding portions of said sheet pass beyond and out of engagement with said contacting elements and while other portions are still engaged thereby.

2. The method of bending glass sheets, which comprises directing a continuously moving sheet, heated to the desired temperature, substantially horizontally between oppositely disposed sheet contacting elements, and carrying the sheet forwardly as it passes out of engagement with said contacting elements upon a runway having a radius of curvature corresponding to the curvature to be given the glass sheet and which serves to progressively bend the sheet as succeeding portions of said sheet move forwardly thereover and while other portions thereof are still engaged by said gripping elements.

3. The method of bending glass sheets, which comprises directing a continuously moving sheet, heated to the desired temperature, substantially horizontally between oppositely disposed sheet contacting elements, and carrying the sheet forwardly and upwardly as it passes out of engagement with said contacting elements upon spaced substantially parallel lines of transverse support and along a path corresponding to the curvature to be given the glass sheet whereby to progressively bend the sheet as succeeding portions thereof move forwardly over said lines of transverse support and while other portions of said sheet are still engaged by said contacting elements.

JOHN L. DRAKE.